United States Patent
Tanaka et al.

(10) Patent No.: US 10,266,660 B2
(45) Date of Patent: Apr. 23, 2019

(54) METHOD FOR MANUFACTURING WET RUBBER MASTERBATCH, WET RUBBER MASTERBATCH, RUBBER COMPOSITION, AND PNEUMATIC TIRE

(71) Applicant: TOYO TIRE & RUBBER CO., LTD., Osaka-shi, Osaka (JP)

(72) Inventors: Makoto Tanaka, Osaka (JP); Kenji Nomura, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 54 days.

(21) Appl. No.: 15/509,541

(22) PCT Filed: Jun. 8, 2015

(86) PCT No.: PCT/JP2015/066481
§ 371 (c)(1),
(2) Date: Mar. 8, 2017

(87) PCT Pub. No.: WO2016/075958
PCT Pub. Date: May 19, 2016

(65) Prior Publication Data
US 2017/0306104 A1    Oct. 26, 2017

(30) Foreign Application Priority Data
Nov. 12, 2014  (JP) ................. 2014-229633

(51) Int. Cl.
*C08J 3/12* (2006.01)
*C08L 21/00* (2006.01)
(Continued)

(52) U.S. Cl.
CPC ............ *C08J 3/12* (2013.01); *B60C 1/00* (2013.01); *C08J 3/226* (2013.01); *C08K 3/04* (2013.01);
(Continued)

(58) Field of Classification Search
CPC ........................................ C08C 1/14
See application file for complete search history.

(56) References Cited

U.S. PATENT DOCUMENTS

2004/0110889 A1* 6/2004 Yagi ............... B60C 1/0016
524/493
2006/0281850 A1* 12/2006 Tokunaga ............ B01J 2/10
524/493
(Continued)

OTHER PUBLICATIONS

Notification of Transmittal of Translation of the International Preliminary Report on Patentability (Form PCT/IB/338) issued in counterpart International Application No. PCT/JP2015/066481 dated May 26, 2017, with Forms PCT/IB/373 and PCT/ISA/237. (6 pages).
(Continued)

Primary Examiner — Robert C Boyle
(74) Attorney, Agent, or Firm — Westerman, Hattori, Daniels & Adrian, LLP

(57) ABSTRACT

A method for manufacturing a wet rubber masterbatch that will serve as raw material for vulcanized rubber having excellent tensile strength and tear strength and that will permit wet rubber masterbatch to be molded in a short time. A method comprising an operation in which a collection of granules comprising a plurality of granular coagula are obtained from a liquid mixture comprising filler and rubber latex solution, and an operation in which the collection of granules is compressed under conditions satisfying Formula I; $3 \leq P \times Da \leq 500$ (P indicates pressure (kgf/cm$^2$) applied to the collection of granules. Da indicates granule diameter (mm) of the granular coagula), making it possible to cause a wet rubber masterbatch capable of serving as raw material for vulcanized rubber having excellent tensile strength and tear strength to be molded in a short time.

13 Claims, 1 Drawing Sheet

US 10,266,660 B2

Page 2

(51) Int. Cl.
*B60C 1/00* (2006.01)
*C08J 3/22* (2006.01)
*C08K 3/04* (2006.01)

(52) U.S. Cl.
CPC ........... *C08L 21/00* (2013.01); *C08J 2307/00* (2013.01); *C08J 2407/02* (2013.01)

(56) References Cited

U.S. PATENT DOCUMENTS

| | | | | |
|---|---|---|---|---|
| 2011/0021664 A1* | 1/2011 | Wang | ................... | C08C 1/15 523/352 |
| 2012/0172517 A1* | 7/2012 | Zhang | ................... | B01F 5/0646 524/526 |

OTHER PUBLICATIONS

Office Action dated Aug. 2, 2018, issued in counterpart Japanese Application No. 2014-229633, with English translation. (6 pages).
Office Action dated Jun. 6, 2018, issued in counterpart German Application No. 112015005129.5, with English translation. (7 pages).
Office Action dated Dec. 4, 2018, issued in counterpart Chinese Application No. 201580050023.6, with English translation (13 pages).
Office Action dated Feb. 28, 2019, issued in Japanese Patent Application No. 2014-229633 with English translation.

* cited by examiner

[FIG. 1]
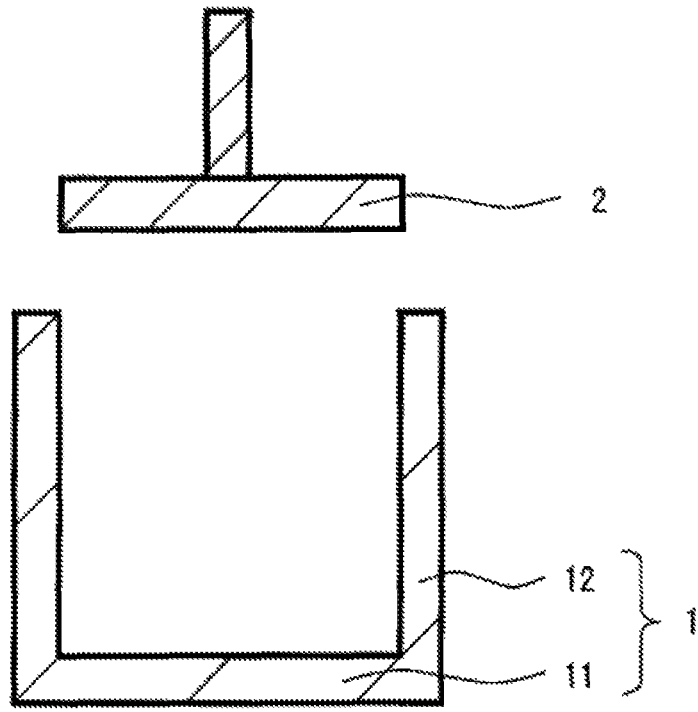
[FIG. 2]
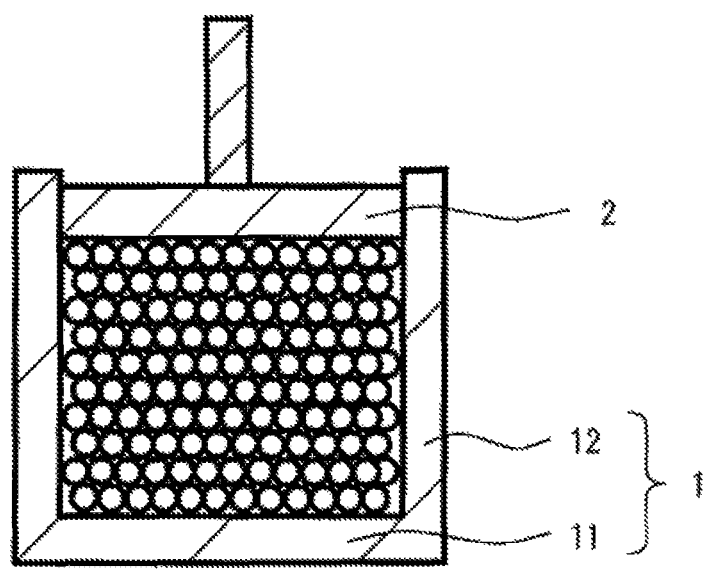

METHOD FOR MANUFACTURING WET RUBBER MASTERBATCH, WET RUBBER MASTERBATCH, RUBBER COMPOSITION, AND PNEUMATIC TIRE

TECHNICAL FIELD

The present invention relates to a method for manufacturing a wet rubber masterbatch, a wet rubber masterbatch, a rubber composition, and a pneumatic tire.

BACKGROUND ART

Use of wet rubber masterbatch to improve filler dispersion characteristics and/or workability during manufacture of a rubber composition containing carbon black or other such filler has been known conventionally in the rubber industry. This involves causing filler and dispersion solvent to be mixed together in advance in a given ratio, causing rubber latex solution and a filler-containing slurry solution in which filler has been dispersed by means of mechanical force within dispersion solvent to be mixed together while in liquid phase, thereafter adding acid or other such coagulant, and collecting and drying the coagulum. As compared with use of dry rubber masterbatch obtained by causing filler and rubber to be mixed together while in solid phase, use of wet rubber masterbatch makes it possible to obtain a rubber composition having excellent filler dispersion characteristics and also having excellent workability as well as reinforcement characteristics and other such rubber properties. By using such a rubber composition as raw material, it is for example possible to manufacture rubber products such as pneumatic tires having reduced rolling resistance and excellent fatigue resistance.

Regarding methods for manufacturing wet rubber masterbatch, Patent Reference No. 1 describes a method in which a liquid mixture is prepared which contains natural rubber latex and a carbon black shiny that contains distilled water and carbon black dispersed within the distilled water, coagulation of the liquid mixture being carried out so as to obtain a granular coagulum.

PRIOR ART REFERENCES

Patent References

PATENT REFERENCE NO. 1: Japanese Patent Application Publication Kokai No. 2010-189511

SUMMARY OF INVENTION

Problem to be Solved by Invention

By using a press to mold a plurality of granular coagula obtained by a method described in Patent Reference No. 1 or the like, it is possible to efficiently transport wet rubber masterbatch. However, as a result of intensive study by the present inventors, it was found that when press conditions are other than optimal there may be reduction in the properties (specifically, tensile strength and tear strength) of the vulcanized rubber that is obtained by vulcanization of the wet rubber masterbatch. It was also found that when press conditions are other than optimal much time may be required for molding.

The present invention was conceived in light of such situation, it being an object thereof to provide a method for manufacturing a wet rubber masterbatch that will serve as raw material for vulcanized rubber having excellent tensile strength and tear strength and that will permit wet rubber masterbatch to be molded in a short time.

Means for Solving Problem

That is, the present invention relates to a method for manufacturing wet rubber masterbatch that comprises an operation in which a collection of granules comprising a plurality of granular coagula are obtained from a liquid mixture comprising filler and rubber latex solution, and an operation in which the collection of granules is compressed under conditions satisfying Formula I.

$$3 \leq P \times Da \leq 500 \quad \text{FORMULA I}$$

(At FORMULA I, P indicates pressure (kgf/cm$^2$) applied to the collection of granules. Da indicates granule diameter (mm) of the granular coagula.)

Because the collection of granules is compressed under conditions satisfying Formula I, it is possible to cause a wet rubber masterbatch capable of serving as raw material for vulcanized rubber having excellent tensile strength and tear strength to be molded in a short time. If P×Da is less than 3, because the pressure acting on the coagula will be small, much time will be required to carry out molding. On the other hand, if P×Da is greater than 500, because the pressure acting on the coagula will be large, tensile strength and tear strength of the vulcanized rubber obtained by vulcanizing the wet rubber masterbatch will be reduced.

It is preferred that granule diameter of the granular coagula be 1 mm to 39 mm. Below 1 mm, because the pressure acting on the coagula will be small, much time will be required to carry out molding. On the other hand, above 39 mm, because the pressure acting on the coagula will be large, tensile strength and tear strength of the vulcanized rubber obtained by vulcanizing the wet rubber masterbatch will be reduced.

The pressure applied to the collection of granules might for example be 4 kgf/cm$^2$ to 25 kgf/cm$^2$.

The present invention also relates to a wet rubber masterbatch obtained by such a manufacturing method.

The present invention also relates to a rubber composition comprising such a wet rubber masterbatch. The rubber composition associated with the present invention may be favorably employed in a tire. The present invention also relates to a pneumatic tire obtained using such a rubber composition.

BRIEF DESCRIPTION OF DRAWINGS

FIG. 1 Schematic sectional diagram showing a mold.

FIG. 2 Schematic sectional diagram of an operation in which a collection of granules is compressed.

EMBODIMENTS FOR CARRYING OUT INVENTION

Method for Manufacturing Wet Rubber Masterbatch

A method for manufacturing wet rubber masterbatch in accordance with the present invention comprises an operation in which a collection of granules comprising a plurality of granular coagula are obtained from a liquid mixture comprising filler and rubber latex solution, and an operation in which the collection of granules is compressed under conditions satisfying Formula I.

$$3 \leq P \times Da \leq 500 \quad \text{FORMULA I}$$

(At FORMULA I, P indicates pressure (kgf/cm$^2$) applied to the collection of granules. Da indicates granule diameter (mm) of the granular coagula.)

A method for manufacturing wet rubber masterbatch in accordance with the present invention may further comprise an operation in which the liquid mixture is obtained by mixing filler and rubber latex solution.

Operation for Obtaining Liquid Mixture

As operation for obtaining the liquid mixture, an operation comprising a step (i) in which filler and solvent are mixed, and a step (ii) in which the liquid mixture is obtained by mixing rubber latex solution and the slurry obtained at step (i); an operation comprising a step (I) in which filler and a first rubber latex solution are mixed, and a step (II) in which the liquid mixture is obtained by mixing a second rubber latex solution and the filler slurry solution obtained at step (I); and the like may be cited as examples. As solvent, while water is preferred, water which may for example contain organic solvent may also be used. It is preferred that the operation in which the liquid mixture is obtained comprise a step (I) in which filler and a first rubber latex solution are mixed, and a step (II) in which the liquid mixture is obtained by mixing a second rubber latex solution and the filler slurry solution obtained at step (I). Employment of step (I) will permit formation of an extremely thin latex phase on all or part of the surface of the filler, and will make it possible to prevent reflocculation of filler. At step(s) (I) and/or (II), surface active agent or the like may be further mixed therein.

Filler refers to carbon black, silica, clay, talc, calcium carbonate, magnesium carbonate, aluminum hydroxide, and/or other such inorganic filler(s) ordinarily used in the rubber industry. Among inorganic fillers, carbon black may in particular be favorably employed.

As examples of carbon black, besides SAF, ISAF, HAF, FEF, GPF, and other such carbon blacks ordinarily used in the rubber industry, acetylene black, Ketchen black, and/or other such electrically conductive carbon blacks may be used. The carbon black may be nongranulated carbon black or may be granulated carbon black that has been granulated based upon considerations related to the handling characteristics thereof as is ordinary practice in the rubber industry.

As first rubber latex solution, natural rubber latex solution and/or synthetic rubber latex solution may be used. The first rubber latex solution comprises dispersion solvent.

As dispersion solvent, while water is preferred, water which may for example contain organic solvent may also be used.

As the natural rubber latex solution, it is preferred that the natural rubber be natural product(s) of plant metabolism, and in particular that the dispersion solvent be water, such that the natural rubber latex solution is a natural rubber/water system. As the natural rubber latex solution, latex concentrate, fresh latex such as that which is referred to as "field latex," or any other such latex may be used without distinction. As synthetic rubber latex solution, these include for example those such as may be manufactured by emulsion polymerization of styrene-butadiene rubber, butadiene rubber, nitrile rubber, and/or chloroprene rubber.

It is preferred that solids (rubber) concentration in the first rubber latex solution be 0.1 mass % to 5 mass %, and more preferred that this be 0.2 mass % to 1.5 mass %.

With regard to the filler slurry solution obtained at step (I), it is preferred that solids content in the filler slurry solution be 0.5% to 10% when expressed as percent by mass of filler, and more preferred that this be 1% to 6%.

As second rubber latex solution, natural rubber latex solution and/or synthetic rubber latex solution may be used. The second rubber latex solution comprises dispersion solvent.

Solids concentration of the second rubber latex solution may be chosen as appropriate based upon such considerations as the time and effort required to dry the coagulum. Based upon considerations of the time and effort that would be involved, it is preferred that solids concentration of the second rubber latex solution be higher than solids concentration of the first rubber latex solution. More specifically, it is preferred that solids concentration in the second rubber latex solution be 10 mass % to 60 mass %, and more preferred that this be 20 mass % to 30 mass %.

As examples of method(s) for the mixing at step (I) and step (II), methods such as those in which mixing is carried out by agitation through use of high-shear mixers, high shear mixers, homomixers, ball mills, bead mills, high-pressure homogenizers, ultrasonic homogenizers, colloid mills, and other such ordinary dispersers may be cited.

"High-shear mixer" refers to a mixer which is provided with rotor(s) and stator(s) and in which there is action of high shear due to rotation of rotor(s) under conditions in which there is precise clearance between stationary stator(s) and rotor(s) capable of rotating at high speed. To cause action of such high shear, it is preferred that clearance between rotor and stator be not greater than 0.8 mm and that rotor circumferential speed be not less than 5 m/s. As such high-shear mixer, commercially available devices may be employed, it being possible to cite high shear mixers manufactured by the Silverson company as examples.

Agitation temperature(s) at step (I) and step (II) may be chosen as appropriate.

The liquid mixture comprises filler and rubber latex solution. Where the liquid mixture is obtained at step (I) and step (1), the rubber latex solution comprises first rubber latex solution, second rubber latex solution, and so forth.

It is preferred that filler be present within the liquid mixture in an amount that is not less than 10 parts by mass, more preferred that this be not less than 20 parts by mass, and still more preferred that this be not less than 30 parts by mass, for every 100 parts by mass of solids content in the rubber latex solution. Furthermore, it is preferred that filler be present within the liquid mixture in an amount that is not greater than 120 parts by mass, and more preferred that this be not greater than 80 parts by mass, for every 100 parts by mass of solids content in the rubber latex solution.

Operation for Obtaining Collection of Granules

The operation in which the collection of granules is obtained might for example comprise a step in which the liquid mixture and coagulant are mixed, a step in which the wet composite obtained at the step in which the liquid mixture and the coagulant are mixed is dewatered, and a step in which a collection of granules is obtained by repeatedly performing a procedure in which granular coagulum or coagula is or are obtained by cutting the composite obtained at the step in which the wet composite is dewatered.

Step in which Liquid Mixture and Coagulant are Mixed

Mixing the liquid mixture and the coagulant makes it possible to cause coagulation of the liquid mixture, permitting the wet composite to be obtained. It is preferred that the step in which the liquid mixture and the coagulant are mixed be a step in which the coagulant is added to the liquid mixture while the liquid mixture is subjected to agitation.

As coagulant, acid and the like may be cited as examples. As acid, formic acid, sulfuric acid, and other such acids ordinarily used for coagulation may be cited as examples.

As agitation method, methods such as those in which agitation is carried out through use of high-shear mixers, high shear mixers, homomixers, ball mills, bead mills, high-pressure homogenizers, ultrasonic homogenizers, colloid mills, and other such ordinary dispersers may be cited as examples.

Step in which Wet Composite is Dewatered

As a result of carrying out dewatering of the wet composite, the composite may be obtained.

As dewatering method, dewatering methods involving use of single screw extruders, ovens, vacuum dryers, air dryers, and other such drying apparatuses may be cited as examples. Of these, methods in which single screw extruder(s) are used to carry out dewatering are preferred. Use of single screw extruder(s) may permit dewatering, drying, and/or plasticization.

Step in which Collection of Granules is Obtained

The collection of granules is obtained by repeatedly performing a procedure in which granular coagulum or coagula is or are obtained by cutting the composite. As cutting method, methods such as those in which the composite is cut through use of a pelletizer may be cited as examples.

The collection of granules comprises a plurality of granular coagula. It is preferred that granule diameter of the granular coagula be not less than 1 mm, and more preferred that this be not less than 2 mm. Below 1 mm, the large contact area between the collection of granules and the mold causes the pressure acting on the coagula to be small, which may cause much time to be required to carry out molding. Furthermore, it is preferred that granule diameter of the granular coagula be not greater than 39 mm, and more preferred that this be not greater than 34 mm. Above 39 mm, the small contact area between the collection of granules and the mold causes the pressure acting on the coagula to be large, which may make it difficult to obtain wet rubber masterbatch capable of serving as raw material for vulcanized rubber having excellent tensile strength and tear strength.

Granule diameter of the granular coagula is measured by the method described at the working examples.

Operation in which Collection of Granules is Compressed

Molding occurs by compressing the collection of granules. An ordinary mold may be used to compress the collection of granules.

A mold such as that shown in FIG. 1 which is provided with a molding vessel 1 provided with lower plate 11 and with sidewalls 12 extending in the thickness direction of lower plate 11 from the edges of lower plate 11, and with an upper plate 2 arranged above molding vessel 1, may be used.

As shown in FIG. 2, a step in which the collection of granules is compressed might for example comprise a step in which the collection of granules is placed within molding vessel 1, and a step in which the collection of granules arranged within molding vessel 1 is compressed by lower plate 11 and upper plate 2.

More specifically, the collection of granules is compressed under conditions satisfying Formula I.

$$3 \leq P \times Da \leq 500 \qquad \text{FORMULA I}$$

(At FORMULA I, P indicates pressure (kgf/cm$^2$) applied to the collection of granules. Da indicates granule diameter (mm) of the granular coagula.)

It is preferred that P×Da be not less than 4, and more preferred that this be not less than 5. Furthermore, it is preferred that P×Da be not greater than 400, more preferred that this be not greater than 350, and still more preferred that this be not greater than 300.

It is preferred that the pressure which is applied to the collection of granules, i.e., P, be not less than 4 kgf/cm$^2$, more preferred that this be not less than 5 kgf/cm$^2$, and still more preferred that this be not less than 6 kgf/cm$^2$. Furthermore, it is preferred that P be not greater than 25 kgf/cm$^2$, more preferred that this be not greater than 24 kgf/cm$^2$, and still more preferred that this be not greater than 23 kgf/cm$^2$.

The wet rubber masterbatch obtained by means of the foregoing method might be in the shape of a rectangular parallelepiped or might be shaped so as to roughly resemble a rectangular parallelepiped or the like. In addition, the wet rubber masterbatch will comprise a rubber component and filler.

It is preferred that filler be present within the wet rubber masterbatch in an amount that is not less than 10 parts by mass, more preferred that this be not less than 20 parts by mass, and still more preferred that this be not less than 30 parts by mass, for every 100 parts by mass of the rubber component. Furthermore, it is preferred that filler be present therein in an amount that is not greater than 120 parts by mass, and more preferred that this be not greater than 80 parts by mass, for every 100 parts by mass of the rubber component.

Rubber Composition

A rubber composition associated with the present invention may be obtained by kneading the wet rubber masterbatch, and where necessary kneading together therewith: sulfur-type vulcanizing agent, vulcanization accelerator, silane coupling agent, zinc oxide, stearic acid, vulcanization accelerator activator, vulcanization retarder, organic peroxide, antioxidant, wax and/or oil and/or or other such softener, processing additive, and/or the like.

A rubber composition associated with the present invention comprises wet rubber masterbatch. A rubber composition associated with the present invention may further comprise sulfur-type vulcanizing agent, vulcanization accelerator, silane coupling agent, zinc oxide, stearic acid, vulcanization accelerator activator, vulcanization retarder, organic peroxide, antioxidant, wax and/or oil and/or or other such softener, processing additive, and/or the like.

As the sulfur in the sulfur-type vulcanizing agent, it being sufficient that this be sulfur as is ordinarily used for rubber, it is possible to use powdered sulfur, precipitated sulfur, insoluble sulfur, high dispersing sulfur, and/or the like. It is preferred that sulfur be present in an amount that is 0.3 part by mass to 6 parts by mass for every 100 parts by mass of the rubber component. A sulfur content under 0.3 part by mass will result in inadequate crosslink density in the vulcanized rubber, reducing rubber strength and so forth; above 6 parts by mass, this will cause worsening of both endurance and heat-resistance in particular. To ensure good rubber strength in the vulcanized rubber and to further improve heat-resistance and endurance, it is more preferred that sulfur be present in an amount that is 1.5 parts by mass to 5.5 parts by mass, and still more preferred that this be 2.0 parts by mass to 4.5 parts by mass, for every 100 parts by mass of the rubber component.

As vulcanization accelerator, sulfenamide-type vulcanization accelerator, thiuram-type vulcanization accelerator, thiazole-type vulcanization accelerator, thiourea-type vulcanization accelerator, guanidine-type vulcanization accelerator, dithiocarbamate-type vulcanization accelerator, and/or other such vulcanization accelerators as are commonly employed for vulcanization of rubber may be used singly or any thereamong may be used in appropriate combination. It is more preferred that vulcanization accelerator be present in an amount that is 1 part by mass to 5 parts by mass, and still more preferred that this be 1.5 parts by mass to 4 parts by mass, for every 100 parts by mass of the rubber component.

As antioxidant, aromatic-amine-type antioxidant, amine-ketone-type antioxidant, monophenol-type antioxidant, bisphenol-type antioxidant, polyphenol-type antioxidant, dithiocarbamate-type antioxidant, thiourea-type antioxidant, and/or other such antioxidants as are commonly employed for rubber may be used singly or any thereamong may be used in appropriate combination. It is more preferred that antioxidant be present in an amount that is 0.3 part by mass to 3.0 parts by mass, and still more preferred that this be 0.5 part by mass to 1.5 parts by mass, for every 100 parts by mass of the rubber component.

A rubber composition associated with the present invention may be favorably employed in a pneumatic tire. More specifically, this may be favorably employed as raw material for tire member(s) of a pneumatic tire. Even more specifically, this may be favorably employed as raw material for the tread and so forth thereof.

A pneumatic tire associated with the present invention might for example be provided with a tire member obtained using such a rubber composition.

Working Examples

Working examples and the like which illustrate the constitution and effect of the present invention in specific terms are described below. The raw material employed was as follows.

Raw Material Employed a) Natural rubber latex solution Solution prepared by adding water at normal temperature to natural rubber fresh latex solution and adjusting rubber content so as to be 25 mass % b) Natural rubber fresh latex solution (NR Field Latex; dry rubber content=31.2%) Manufactured by Golden Hope c) Coagulant Formic acid (reagent-grade 85%; diluted to obtain 10% solution; pH adjusted to 1.2) manufactured by Nacalai Tesque, Inc.

d) "N110" carbon black "SEAST 9" manufactured by Tokai Carbon Co., Ltd. ($N_2SA$ 142 m$^2$/g)

e) "N330" carbon black "SEAST 3" manufactured by Tokai Carbon Co., Ltd. ($N_2SA$ 79 m$^2$/g)

f) "N550" carbon black "SEAST SO" manufactured by Tokai Carbon Co., Ltd. ($N_2SA$ 42 m$^2$/g)

g) Flowers of zinc "Zinc Oxide No. 3" manufactured by Mitsui Mining & Smelting Co., Ltd.

h) Stearic acid "LUNAC S-20" manufactured by Kao Corporation i) Wax "OZOACE 0355" manufactured by Nippon Seiro Co., Ltd.

j) Antioxidant (A) "6PPD" manufactured by Monsanto Company (N-phenyl-N'-(1,3-dimethylbutyl)-p-phenylenediamine; melting point 44° C.)

k) Antioxidant (B) "RD" manufactured by Ouchi Shinko Chemical Industrial Co., Ltd. (2,2,4-trimethyl-1,2-dihydroquinoline polymer; melting point 80° C. to 100° C.)

l) Sulfur "5% Oil Treated Sulfur Powder" manufactured by Tsurumi Chemical Industry Co., Ltd.

m) Vulcanization accelerator (A) "Sanceler CM" manufactured by Sanshin Chemical Industry Co., Ltd. (N-cyclohexyl-2-benzothiazolesulfenamide)

n) Vulcanization accelerator (B) "NOCCELER D" manufactured by Ouchi Shinko Chemical Industrial Co., Ltd. (1,3-diphenylguanidine)

Preparation of Coagulum

Carbon black in amounts as listed at TABLES 1 through 5 was added to dilute (0.5 mass %) natural rubber latex solution, and a ROBO MIX manufactured by PRIMIX Corporation was used to disperse the carbon black (ROBO MIX conditions: 9000 rpm; 30 min) to manufacture a "shiny solution containing carbon black to which natural rubber latex particles were adhered" (Operation (I)).

Next, the remaining natural rubber latex solution (to which water had been added in such amount as to cause solids (rubber) concentration to be 25 mass %) was, together with the natural rubber latex solution used at Operation (I), added to the "slurry solution containing carbon black to which natural rubber latex particles were adhered" in such amount as to cause solids (rubber) content to be 100 parts by mass, following which an SM-L56 mixer for household use manufactured by SANYO was used to carry out agitation (mixer conditions: 11300 rpm; 30 min) to manufacture a "natural rubber latex solution containing carbon black to which natural rubber latex particles were adhered" (Operation (II)).

While maintaining the "natural rubber latex solution containing carbon black to which natural rubber latex particles were adhered" at 90° C., a 10 mass % aqueous solution of formic acid serving as coagulant was added to the "natural rubber latex solution containing carbon black to which natural rubber latex particles were adhered" in an amount sufficient to achieve a pH of 4 so as to cause coagulation thereof. As a result, a coagulum was obtained.

Preparation of Collection of Granules

A Model V-02 screw press (squeezer-type single-screw dewatering extruder) manufactured by Suehiro EPM Corporation was used to dry the coagulum until water content was not greater than 1.5%, following which a pelletizer was used to cut the coagulum to obtain a collection of granules comprising a plurality of granular coagula.

Calculation of Granule Diameter (Da)

Sieve testing was carried out in accordance with JIS Z-8815-1994 to measure granule diameter distribution within the collection of granules. Values for percent of sample retained by sieves having openings of various sizes were then added in order from the sieve having the largest opening to calculate the size of the sieve opening for which the estimated percent of sample retained by the sieve was 90%. The size of the sieve opening for which the estimated percent of sample retained by the sieve was 90% was taken to be the granule diameter, this granule diameter being what is shown at TABLES 1 through 5.

Preparation of Wet Natural Rubber Masterbatch

As shown in FIG. 1, a press mold (manufactured by the Li-Hoe company) was prepared which was provided with a molding vessel 1 provided with a lower plate 11 and with sidewalls 12 extending in the thickness direction of the lower plate 11 from the edges of the lower plate 11, and with an upper plate 2 arranged above the molding vessel 1. Collections of granules having granule diameters as listed at TABLES 1 through 5 were placed in molding vessel 1. As shown in FIG. 2, the collection of granules arranged within molding vessel 1 was then pressed at a pressure as listed at TABLES 1 through 5 to obtain wet natural rubber masterbatch in the shape of a rectangular parallelepiped.

Evaluation 1: Workability

Amount of time required to obtain the wet natural rubber masterbatch in the shape of the rectangular parallelepiped was measured.

Evaluation 2: Vulcanized Rubber Properties

Compounding ingredients except for sulfur and vulcanization accelerator were blended in accordance with the blending recipes listed at TABLES 1 through 5, and a Model B Banbury mixer manufactured by Kobe Steel, Ltd., was used to carry out kneading to obtain a kneaded mass. Sulfur and vulcanization accelerator were added to the kneaded mass in accordance with the blending recipes listed at TABLES 1 through 5, and this was kneaded to obtain an unvulcanized rubber composition. The unvulcanized rubber composition was vulcanized at conditions of 150° C. for 30 min to obtain vulcanized rubber. Evaluation of the vulcanized rubber was carried out as follows. Results are shown in TABLES 1 through 5.

Vulcanized Rubber Tensile Strength

Samples were fabricated from the vulcanized rubber in the shape of JIS No. 3 dumbbells. The 300% modulus of the samples was measured in accordance with JIS-K 6251. Results at TABLE 1 are indexed relative to the value obtained at Comparative Example 1, which was taken to be 100. Results at TABLE 2 are indexed relative to the value obtained at Comparative Example 3, which was taken to be 100. Results at TABLE 3 are indexed relative to the value obtained at Comparative Example 5, which was taken to be 100. Results at TABLE 4 are indexed relative to the value obtained at Comparative Example 7, which was taken to be 100. Results at TABLE 5 are indexed relative to the value obtained at Comparative Example 9, which was taken to be 100. This means that the larger the number the better the prevention of rubber deterioration and the more excellent the rubber properties of the wet natural rubber masterbatch.

Vulcanized Rubber Tear Strength

The vulcanized rubber was punched to obtain crescent-shaped samples as defined by JIS K 6252, a nick which was 0.50 mm±0.08 mm being placed at the center of the concavity. A tensile test machine from Shimadzu Corporation was used to measure tear strength at a grip separation rate of 500 mm/min. Results at TABLE 1 are indexed relative to the value obtained at Comparative Example 1, which was taken to be 100. Results at TABLE 2 are indexed relative to the value obtained at Comparative Example 3, which was taken to be 100. Results at TABLE 3 are indexed relative to the value obtained at Comparative Example 5, which was taken to be 100. Results at TABLE 4 are indexed relative to the value obtained at Comparative Example 7, which was taken to be 100. Results at TABLE 5 are indexed relative to the value obtained at Comparative Example 9, which was taken to be 100. This means that the larger the number the more excellent the resistance to tearing.

TABLE 1

| | | Comparative Example 1 | Comparative Example 2 | Working Example 1 | Working Example 2 | Working Example 3 | Working Example 4 | Working Example 5 |
|---|---|---|---|---|---|---|---|---|
| | | Amount (parts by mass) | | | | | | |
| Coagulum | N550 carbon black | 70 | 70 | 70 | 70 | 70 | 70 | 70 |
| | N330 carbon black | — | — | — | — | — | — | — |
| | N110 carbon black | — | — | — | — | — | — | — |
| | Natural rubber (solids content) | 100 | 100 | 100 | 100 | 100 | 100 | 100 |
| | | Amount (parts by mass) | | | | | | |
| Unvulcanized rubber composition | Wet natural rubber masterbatch | 170 | 170 | 170 | 170 | 170 | 170 | 170 |
| | Flowers of zinc | 3 | 3 | 3 | 3 | 3 | 3 | 3 |
| | Stearic acid | 2 | 2 | 2 | 2 | 2 | 2 | 2 |
| | Wax | 2 | 2 | 2 | 2 | 2 | 2 | 2 |
| | Antioxidant (A) | 2 | 2 | 2 | 2 | 2 | 2 | 2 |
| | Antioxidant (B) | 1 | 1 | 1 | 1 | 1 | 1 | 1 |
| | Sulfur | 2 | 2 | 2 | 2 | 2 | 2 | 2 |
| | Vulcanization accelerator (A) | 1.5 | 1.5 | 1.5 | 1.5 | 1.5 | 1.5 | 1.5 |
| | Vulcanization accelerator (B) | 0.5 | 0.5 | 0.5 | 0.5 | 0.5 | 0.5 | 0.5 |
| | | Press Conditions | | | | | | |
| P (kgf/cm$^2$) | | 18.0 | 1.0 | 8.0 | 8.0 | 8.0 | 8.0 | 8.0 |
| Da (mm) | | 50.0 | 0.6 | 0.6 | 50.0 | 1.0 | 34.0 | 39.0 |
| P × Da | | 900 | 0.6 | 4.8 | 400 | 8 | 272 | 312 |
| | | Workability | | | | | | |
| Time required for press molding (min) | | 1 | 5 | 2 | 1 | 1 | 1 | 1 |
| | | Vulcanized Rubber Properties | | | | | | |
| Tensile strength (relative to index value) | | 100 | 115 | 125 | 116 | 125 | 126 | 121 |
| Tear strength (relative to index value) | | 100 | 114 | 126 | 112 | 128 | 127 | 120 |

TABLE 2

| | | Comparative Example 3 | Comparative Example 4 | Working Example 6 |
|---|---|---|---|---|
| | Amount (parts by mass) | | | |
| Coagulum | N550 carbon black | 20 | 20 | 20 |
| | N330 carbon black | — | — | — |
| | N110 carbon black | — | — | — |
| | Natural rubber (solids content) | 100 | 100 | 100 |
| | Amount (parts by mass) | | | |
| Unvulcanized rubber composition | Wet natural rubber masterbatch | 120 | 120 | 120 |
| | Flowers of zinc | 3 | 3 | 3 |
| | Stearic acid | 2 | 2 | 2 |
| | Wax | 2 | 2 | 2 |
| | Antioxidant (A) | 2 | 2 | 2 |
| | Antioxidant (B) | 1 | 1 | 1 |
| | Sulfur | 2 | 2 | 2 |
| | Vulcanization accelerator (A) | 1.5 | 1.5 | 1.5 |
| | Vulcanization accelerator (B) | 0.5 | 0.5 | 0.5 |
| | Press Conditions | | | |
| | P (kgf/cm$^2$) | 18.0 | 18.0 | 18.0 |
| | Da (mm) | 50.0 | 0.1 | 20.0 |
| | P × Da | 900 | 1.8 | 360 |
| | Workability | | | |
| | Time required for press molding (min) | 1 | 5 | 1 |
| | Vulcanized Rubber Properties | | | |
| | Tensile strength (relative to index value) | 100 | 115 | 124 |
| | Tear strength (relative to index value) | 100 | 113 | 126 |

TABLE 3

| | | Comparative Example 5 | Comparative Example 6 | Working Example 7 |
|---|---|---|---|---|
| | Amount (parts by mass) | | | |
| Coagulum | N550 carbon black | 100 | 100 | 100 |
| | N330 carbon black | — | — | — |
| | N110 carbon black | — | — | — |
| | Natural rubber (solids content) | 100 | 100 | 100 |
| | Amount (parts by mass) | | | |
| Unvulcanized rubber composition | Wet natural rubber masterbatch | 200 | 200 | 200 |
| | Flowers of zinc | 3 | 3 | 3 |
| | Stearic acid | 2 | 2 | 2 |
| | Wax | 2 | 2 | 2 |
| | Antioxidant (A) | 2 | 2 | 2 |
| | Antioxidant (B) | 1 | 1 | 1 |
| | Sulfur | 2 | 2 | 2 |
| | Vulcanization accelerator (A) | 1.5 | 1.5 | 1.5 |
| | Vulcanization accelerator (B) | 0.5 | 0.5 | 0.5 |
| | Press Conditions | | | |
| | P (kgf/cm$^2$) | 18.0 | 18.0 | 18.0 |
| | Da (mm) | 50.0 | 0.1 | 20.0 |
| | P × Da | 900 | 1.8 | 360 |
| | Workability | | | |
| | Time required for press molding (min) | 1 | 5 | 1 |
| | Vulcanized Rubber Properties | | | |
| | Tensile strength (relative to index value) | 100 | 117 | 125 |
| | Tear strength (relative to index value) | 100 | 113 | 126 |

TABLE 4

|  |  | Comparative Example 7 | Comparative Example 8 | Working Example 8 |
|---|---|---|---|---|
| Amount (parts by mass) | | | | |
| Coagulum | N550 carbon black | — | — | — |
|  | N330 carbon black | — | — | — |
|  | N110 carbon black | 70 | 70 | 70 |
|  | Natural rubber (solids content) | 100 | 100 | 100 |
| Amount (parts by mass) | | | | |
| Unvulcanized rubber composition | Wet natural rubber masterbatch | 170 | 170 | 170 |
|  | Flowers of zinc | 3 | 3 | 3 |
|  | Stearic acid | 2 | 2 | 2 |
|  | Wax | 2 | 2 | 2 |
|  | Antioxidant (A) | 2 | 2 | 2 |
|  | Antioxidant (B) | 1 | 1 | 1 |
|  | Sulfur | 2 | 2 | 2 |
|  | Vulcanization accelerator (A) | 1.5 | 1.5 | 1.5 |
|  | Vulcanization accelerator (B) | 0.5 | 0.5 | 0.5 |
| Press Conditions | | | | |
|  | P (kgf/cm$^2$) | 18.0 | 18.0 | 18.0 |
|  | Da (mm) | 50.0 | 0.1 | 20.0 |
|  | P × Da | 900 | 1.8 | 360 |
| Workability | | | | |
| Time required for press molding (min) | | 1 | 5 | 1 |
| Vulcanized Rubber Properties | | | | |
| Tensile strength (relative to index value) | | 100 | 114 | 125 |
| Tear strength (relative to index value) | | 100 | 117 | 125 |

TABLE 5

|  |  | Comparative Example 9 | Comparative Example 10 | Working Example 9 |
|---|---|---|---|---|
| Amount (parts by mass) | | | | |
| Coagulum | N550 carbon black | 35 | 35 | 35 |
|  | N330 carbon black | 35 | 35 | 35 |
|  | N110 carbon black | — | — | — |
|  | Natural rubber (solids content) | 100 | 100 | 100 |
| Amount (parts by mass) | | | | |
| Unvulcanized rubber composition | Wet natural rubber masterbatch | 170 | 170 | 170 |
|  | Flowers of zinc | 3 | 3 | 3 |
|  | Stearic acid | 2 | 2 | 2 |
|  | Wax | 2 | 2 | 2 |
|  | Antioxidant (A) | 2 | 2 | 2 |
|  | Antioxidant (B) | 1 | 1 | 1 |
|  | Sulfur | 2 | 2 | 2 |
|  | Vulcanization accelerator (A) | 1.5 | 1.5 | 1.5 |
|  | Vulcanization accelerator (B) | 0.5 | 0.5 | 0.5 |
| Press Conditions | | | | |
|  | P (kgf/cm$^2$) | 18.0 | 18.0 | 18.0 |
|  | Da (mm) | 50.0 | 0.1 | 20.0 |
|  | P × Da | 900 | 1.8 | 360 |
| Workability | | | | |
| Time required for press molding (min) | | 1 | 5 | 1 |
| Vulcanized Rubber Properties | | | | |
| Tensile strength (relative to index value) | | 100 | 114 | 127 |
| Tear strength (relative to index value) | | 100 | 116 | 125 |

From TABLE 1, it is clear that vulcanized rubber from the wet rubber masterbatch obtained by pressing the collection of granules under conditions for which P×Da was 900 had inferior tensile strength and inferior tear strength (see Comparative Example 1). It is clear that pressing the collection of granules under conditions for which P×Da was 0.6 resulted in situation in which 5 minutes was required for press molding (see Comparative Example 2). However, it is clear that pressing the collection of granules under conditions for which P×Da was 3 to 500 resulted in a situation in which a wet rubber masterbatch capable of serving as raw material for vulcanized rubber having excellent tensile strength and tear strength could be obtained in 1 to 2 minutes or the like (see Working Examples 1 through 5).

The invention claimed is:

1. A method for manufacturing wet rubber masterbatch comprising:
   an operation in which a collection of granules comprising a plurality of granular coagula are obtained from a liquid mixture comprising filler and rubber latex solution; and
   an operation in which the collection of granules is compressed under conditions satisfying Formula I;
   Formula I being 3≤P×Da≤500;
   wherein, at Formula I, P indicates pressure in units of kgf/cm$^2$ applied to the collection of granules, and Da indicates granule diameter in units of mm of the granular coagula;
   wherein the filler comprises carbon black.

2. The method for manufacturing wet rubber masterbatch according to claim 1 wherein the granule diameter of the granular coagula is 1 mm to 39 mm.

3. The method for manufacturing wet rubber masterbatch according to claim 1 wherein the pressure applied to the collection of granules is 4 kgf/cm$^2$ to 25 kgf/cm$^2$.

4. The method for manufacturing wet rubber masterbatch according to claim 1 wherein the filler consists of carbon black.

5. The method for manufacturing wet rubber masterbatch according to claim 1 wherein the rubber latex solution is natural rubber latex solution.

6. The method for manufacturing wet rubber masterbatch according to claim 1 wherein the filler is present within the liquid mixture in an amount that is 10 parts by mass to 120 parts by mass for every 100 parts by mass of solids content in the rubber latex solution.

7. The method for manufacturing wet rubber masterbatch according to claim 1 wherein the filler is present within the liquid mixture in an amount that is 20 parts by mass to 120 parts by mass for every 100 parts by mass of solids content in the rubber latex solution.

8. The method for manufacturing wet rubber masterbatch according to claim 1 wherein the filler is present within the liquid mixture in an amount that is 30 parts by mass to 80 parts by mass for every 100 parts by mass of solids content in the rubber latex solution.

9. The method for manufacturing wet rubber masterbatch according to claim 1 wherein the granule diameter of the granular coagula is 2 mm to 34 mm.

10. The method for manufacturing wet rubber masterbatch according to claim 1 wherein the pressure applied to the collection of granules is 5 kgf/cm$^2$ to 24 kgf/cm$^2$.

11. The method for manufacturing wet rubber masterbatch according to claim 1 wherein the pressure applied to the collection of granules is 6 kgf/cm$^2$ to 23 kgf/cm$^2$.

12. A method for manufacturing a pneumatic tire, the method comprising:
    an operation in which wet rubber masterbatch is made by the method according to claim 1;
    an operation in which a rubber composition comprising the wet rubber masterbatch is made;
    an operation in which the rubber composition is used to make the pneumatic tire.

13. The method for manufacturing the pneumatic tire according to claim 12 wherein the operation in which the rubber composition is made comprises kneading at least the wet rubber masterbatch and stearic acid.

* * * * *